United States Patent Office 3,263,059
Patented July 26, 1966

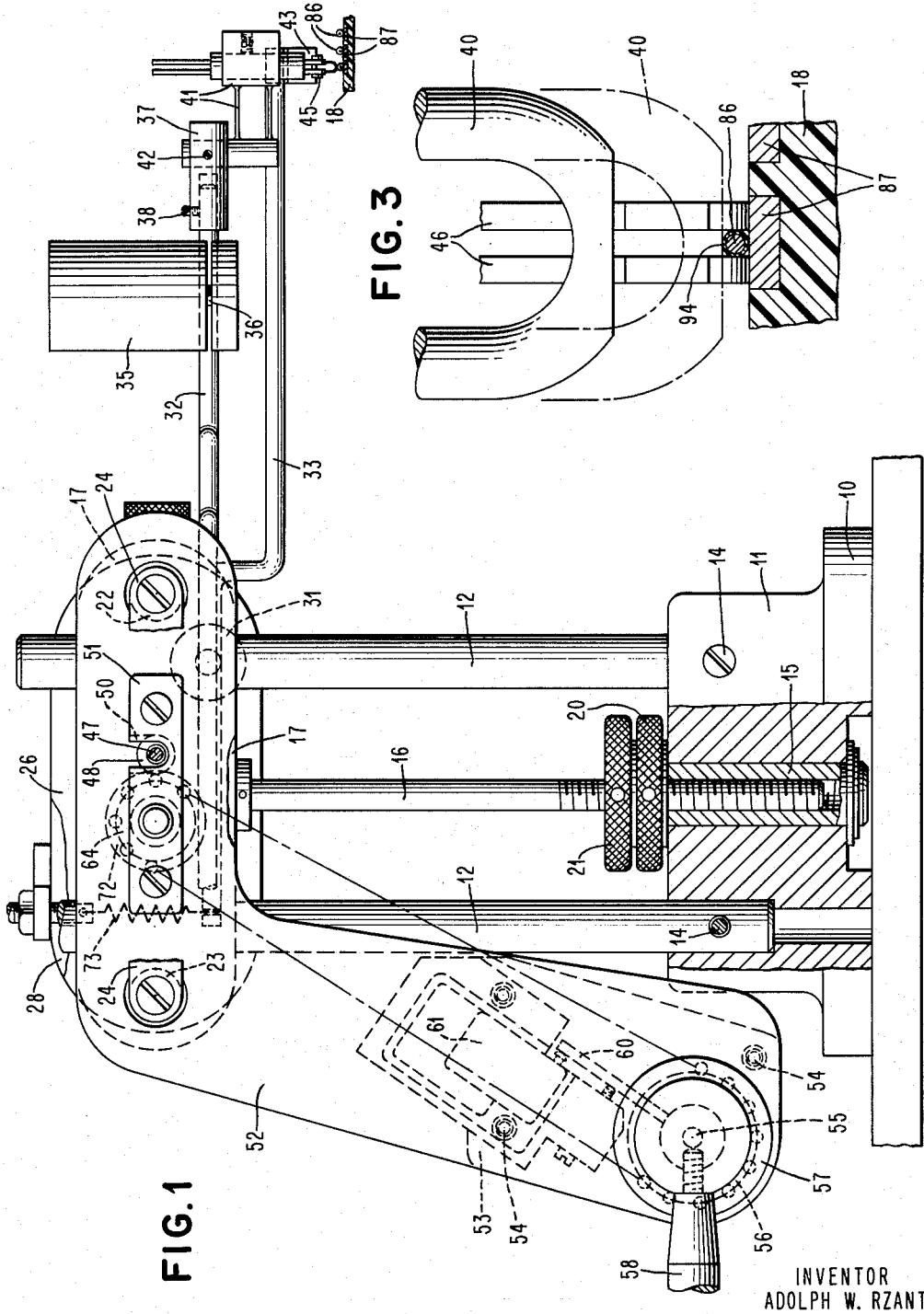

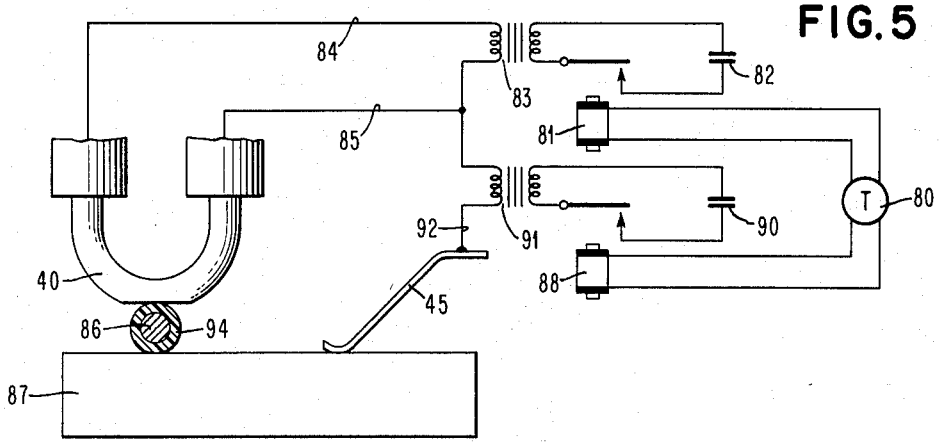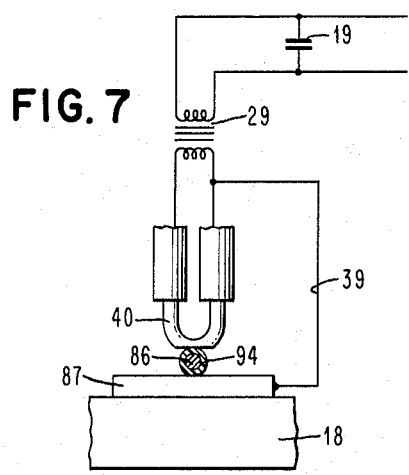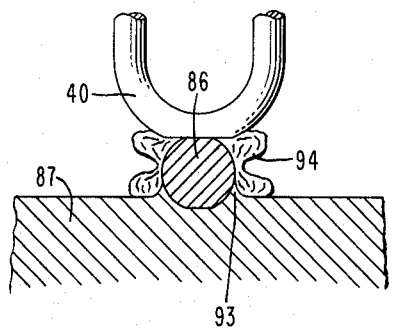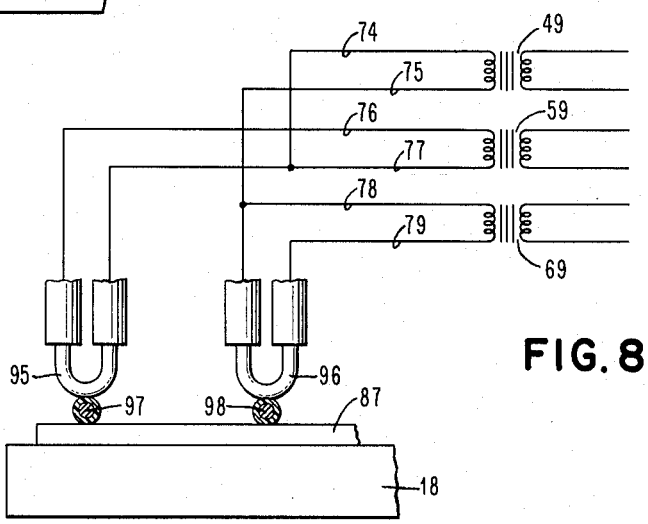

3,263,059
FINE INSULATED WIRE WELDER
Adolph W. Rzant, Poughkeepsie, N.Y., assignor to International Business Machines Corporation, New York, N.Y., a corporation of New York
Filed Nov. 19, 1963, Ser. No. 324,698
8 Claims. (Cl. 219—91)

This invention relates to welding and more particularly to a resistance welder for welding insulated subminiature members.

Heretofore it has been necessary to strip the insulation from wires before making a brazed or welded connection.

It is the principal object of this invention to provide a welder wherein the coating or insulation is melted just prior to forming the weld.

Another object is to provide a resistance welder that is capable of uniformly welding a plurality of fine insulated wires to a common or single contact.

The foregoing and other objects, features and advantages of the invention will be apparent from the following more particular description of the preferred embodiment of the invention, as illustrated in the accompanying drawings.

In the drawings:

FIG. 1 is a side elevation of a welder embodying the invention.

FIG. 3 is an enlarged detail of the movable electrode and holding finger.

FIG. 5 is a schematic of the preferred form of welding circuit.

FIG. 6 is an enlarged showing of a weld made with the invention.

FIGS. 7 and 8 are schematics of modified forms of the welding circuit.

Figure 4:
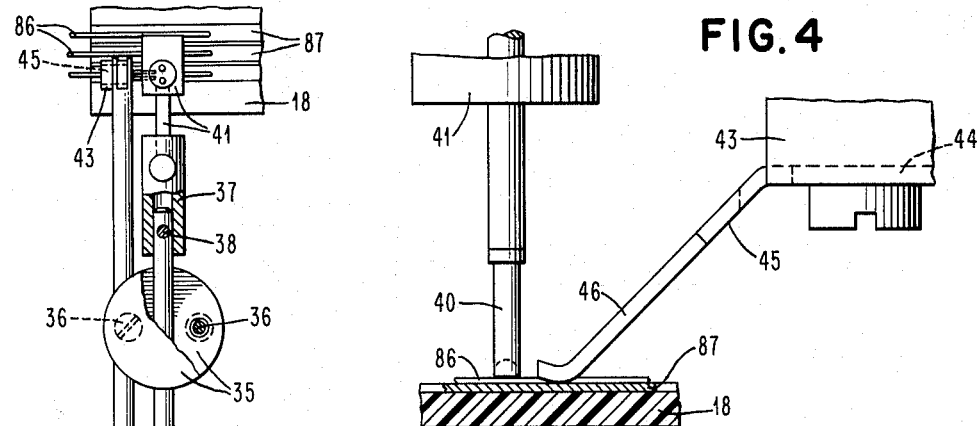
FIG. 4 is a side elevation of FIG. 3.

In the preferred form of the invention the insulated wire is to be brazed or welded to a terminal or strip. The wire is held in position by a foot that is connected in the welding circuit. This foot will straddle the wire and may be used to position it with relation to the terminal as well as provide electrical contact prior to engaging the welding electrode with the wire. The electrode under pressure is heated by a suitable electrical pulse allowing it to melt the insulation on the top side of the wire thus making metallic contact to the wire, and heating it to melt the insulation on the underside, permitting contact to be made between wire and strip or terminal. Once metallic contact is made the current is free to travel through the strip or terminal and effect a bond. A timing circuit controls the circuitry to heater and welder.

As shown in FIG. 1, the welder is mounted on a base 10 on which is formed a boss 11, provided with holes to take the posts 12 secured therein by set screws 14. A threaded sleeve 15 secured in the boss is adapted to receive a threaded rod 16 that adjustably supports a head 17 in which the electrodes are carried. A suitable table 18 for supporting the work is mounted on, but insulated from, the base 10. The relation between the electrodes and the table is adjusted by rotation of knurled nut 20 which raises or lowers the rod 16 in turn moving the head up or down. Once the head is adjusted a knurled nut 21 is used to lock the parts in place.

Figure 2:
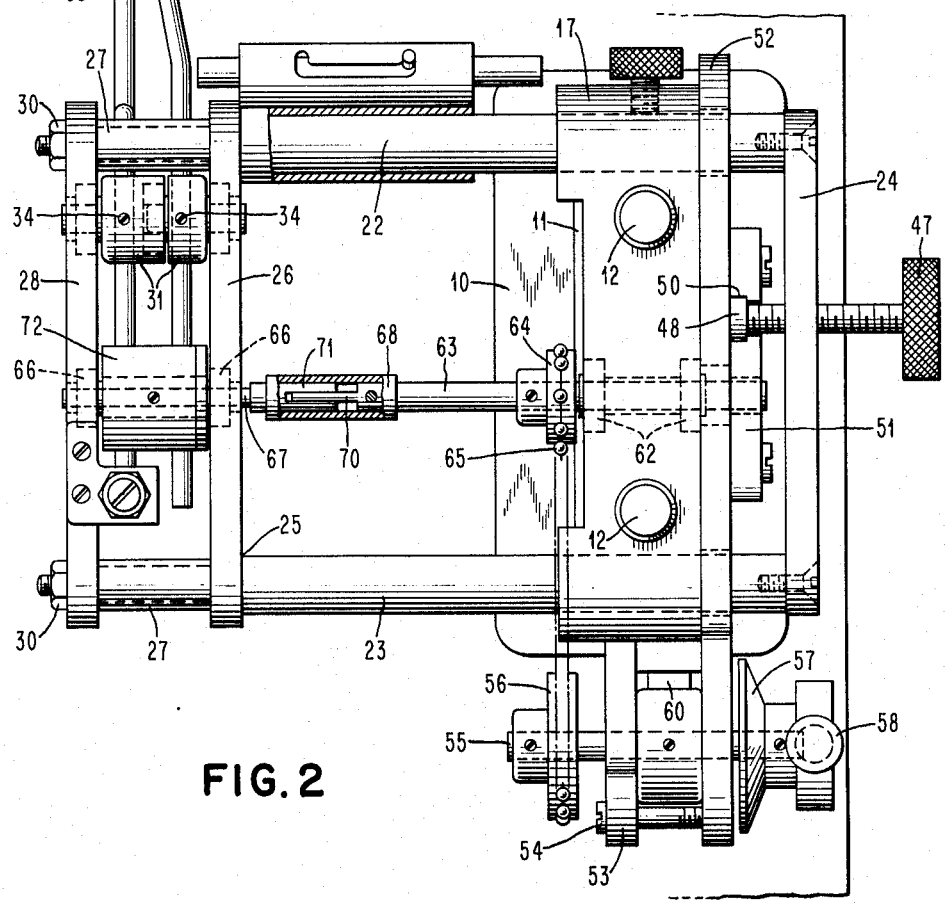
FIG. 2 is a plan view of FIG. 1.

Slidably mounted in the head 17, and extending at right angles to the posts 12 (FIG. 2) are rods 22 and 23, one end of each of which is secured together in a plate 24. The other end of each rod is reduced to form a shoulder 25 against which a bar 26 is positioned. Sleeves 27 on the reduced ends of rods 22 and 23, position bar 28 with respect to bar 26, the members being fastened by nuts 30 on rods 22 and 23 to form a rectangular frame slidable in the head 17. Between plates 26 and 28 is journalled a cylindrical member 31, provided with apertures for holding rods 32 and 33 that extend at right angles to rods 22 and 23 to the welding position. Both rods are slightly flexible and are adjustably secured in the member 31 by set screws 34. A cylindrical weight 35 is adjustably clamped on rod 32 by screws 36 for a purpose to be described later.

The end of rod 32 is inserted and fastened into a sleeve 37 by a set screw 38. A U-shaped electrode 40 (FIG. 3) is carried in a fixture 41 that is adjustably secured in sleeve 37 by a set screw 42.

The end of rod 33 is split to receive a fixture 43 which is formed with a slot 44 into which is secured the end of a spring contact 45 that is split to form feet 46.

Lateral adjustment of the electrode frame 22, 23, 24, 26 and 28 is obtained through a knurled headed screw 47. The screw coacts with threads in cross bar 24 and has a head 48 on the inner end that engages an undercut slot 50 in a plate 51, secured to an L-shaped plate 52, that is secured to the side of the head 17. Rotation of screw 47 will slide the electrode frame in the head 17 to permit location of the electrode 40 and contacts 45 with respect to the work.

To the depending end of L-shaped plate 52, a second plate 53 is secured by screws 54. A shaft 55 is journalled in plates 52 and 53 and has a sprocket wheel 56 secured on one end and knob 57 on the other. The knob is provided with a handle 58 by which the wheel 56 may be easily and quickly oscillated. Secured to shaft 55 between plates 52 and 53 is an arm 60 that actuates a microswitch 61 mounted on plate 53. The function of the switch will be described later.

Journalled in bearings 62, carried in the head 17, is a shaft 63 on which is mounted a sprocket wheel 64 that is connected by a chain 65 to sprocket wheel 56. Journalled in bearings 66, carried in plates 26 and 28, and aligned with shaft 63, is a second shaft 67. A slidable coupling comprising a sleeve 68, secured to the end of shaft 63, encloses a tenor 70 on shaft 63, that engages the slotted end 71 of shaft 67. This coupling permits movement between the shafts during lateral adjustment of the electrode.

Secured to shaft 67, between plates 26 and 28, is an eccentric 72, against which the ends of rods 32 and 33 are held by a spring 73. This eccentric will raise and lower the electrode 40 and contacts 46 through the oscillation of handle 58, which will rock shafts 63 and 67 through the chain connected sprockets 56 and 65.

In operation, the electrode is adjusted vertically with respect to the work on table 18 by raising or lowering the head 17 by means of knurled nut 20. The adjustment is locked in place by nut 21. Lateral adjustment is then made by knurled nut 47. The handle 58 is then rotated clockwise (FIG. 1) rotating the eccentric 72 to its high position, raising the electrode and contacts away from the work to permit the positioning of a wire to be welded or brazed. The lever 58 is then rotated counter clockwise to the position of FIG. 1, this will permit spring 73 to lower the electrode and contact into adjusted position. At the same time the arm 60 will operate microswitch 61 to start a welding cycle.

The welding cycle is such that current is applied by a timer 80 (FIG. 5) to a relay 81 that closes its contact to complete a circuit which will discharge a condenser 82 through transformer 83 over leads 84 and 85 through electrode 40. This will heat the electrode, then the insulation on wire 86, and melt it until the electrode reaches the bare wire. During all this period the weight 35 described above exerts a constant pressure on the wire. As the wire is heated further, the insulation on the underside melts away and the wire 86, and strip 87 to which it is to be welded, come into metal to metal contact. The timer now releases relay 81 and operates relay 88, which closes its contact and discharges condenser 90 through transformer 91 over common lead 85, electrode 40, wire 86, strip or terminal 87, spring contact 45, lead 92, back to the transformer. This will soften strip 87 and here again the weight 35 will exert even pressure to force wire 86 into strip 87, as seen in FIG. 6, where it is seen that wire 86 has been flattened and pressed into the softened strip. This forces fillets 93 up on each side of the wire. The matter 94 on each side of the wire is the melted insulation which tends to cover the weld. It will be quite obvious that the wire could soften first but not sufficiently to spread itself over the strip 87 because of the short heating time 1–3 milliseconds. It will be noted that the legs of the spring contact 45 straddle the wire as seen in FIG. 3, thus insuring good electrical contact to the strip on both sides of the wire.

The circuit shown in FIG. 7 eliminates the use of the spring contact 45 and its associated circuitry. In this instance, the insulation is melted by the discharge of condenser 19 through transformer 29. A large enough pulse is used so that enough energy remains once metallic contact between wire 86 and strip 87 is made to short circuit one half the electrode 40 over the low resistance path or lead 39 to effect a braze or weld.

In FIG. 8 is shown a form of circuit in which the contact springs 45 are omitted. Two individual electrodes 95 and 96 contact wires 97 and 98 that are to be welded to a strip 87. A timer circuit, similar to that described above, discharges condensers through transformers 59 and 69 over leads 76, 77, 78 and 79 to electrodes 95 and 96 through wires 97 and 98, removing insulation on wires 97 and 98, thus making metallic contact to strip 87. Welding or brazing the wires to the strip is now accomplished by discharging condensers through transformer 49 over leads 74 and 75 to electrodes 95 and 96, and completing the circuit through strip 87, eliminating the return line.

The electrode 40 is formed of molybdenum and may be made self-cleaning. One of the properties is that it oxidizes and vaporizes at approximately the same temperature. Thus, if after a welding cycle, the electrode is raised from the work and the transformer 83 pulsed, the electrode will be heated to a vaporizing temperature and therefore cleaned prior to the next weld cycle. The same current is used as that for melting the insulation.

It is obvious that the power supply for providing current to generate interfacial resistance for welding or brazing may be either a D.C. condenser bank, as shown, or A.C. line frequency. Also a platinum rhodium alloy may be substituted for the molybdenum electrode with only slight change in characteristics.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a welder of the type described, a table for supporting two members to be welded, one being coated,
   a head adjustably supported with respect to said table,
   an electrode supported by said head,
   a spring contact supported by said head, providing an electrical return path and holding one of said members to be welded,
   means for rocking said electrode and contact from a raised position to one with said electrode in engagement with said coated member and said contact in engagement with said second member,
   a circuit closed by said rocking means when said electrode is lowered, to cause said electrode to melt said coating on the top and bottom of said first member to attain metal to metal contact between said electrode and said second member, and
   a second circuit connected through said electrode and contact to effect a weld between said members.

2. In a welder of the type described, a table for supporting two members to be welded, one being coated,
   a head adjustably supported with respect to said table,
   a pair of arms mounted in said head, one of said arms supporting an electrode,
   the second arm supporting a spring contact, providing an electrical return path and holding one of said members to be welded,
   means for rocking said arms from a raised position to one with said electrode in engagement with said coated member and said contact in engagement with said second member,
   a circuit closed by said rocking means when said arms are lowered to cause said electrode to melt said coating on the top and bottom of said first member to attain metal to metal contact between said electrode and said second member, and
   a second circuit connected through said electrode and contact to effect a weld between said members.

3. In a welder of the type described, a table for supporting two members to be welded, one being coated,
   a head adjustably supported with respect to said table,
   an electrode supported by said head,
   means for rocking said electrode from a raised position to one with said electrode in engagement with said coated member,
   a switch closed by said rocking means when said electrode is lowered,
   a timing means controlled by said switch, and
   a circuit controlled by said timing means to cause said electrode to melt said coating on the top and bottom of said coated member to attain metal to metal contact between said electrode and said other member preparatory to effecting a weld between said members.

4. In a welder of the type described, a table for supporting two members to be welded, one coated and the second uncoated,
   a head adjustably supported with respect to said table,
   a pair of arms mounted in said head,
   one of said arms supporting an electrode,
   the second arm supporting a spring contact providing an electrical return path and holding one of said members to be welded,
   means for rocking said arms from a raised position to one with said electrode in engagement with said coated member and said contact in engagement with said second member,
   a switch closed by said rocking means when said arms are lowered,
   a timing means controlled by said switch,
   a circuit controlled by said timing means to cause said electrode to melt said coating on the top and bottom of said first member to attain metal to metal contact between said electrode and said second member, and
   a second circuit controlled by said timing means acting through said electrode and contact to effect a weld between said members.

5. A process of resistance welding comprising the steps of removably arranging an assembly to be welded on a table,
   vertically and horizontally adjusting a head member carrying an electrode and a spring contact with respect to said assembly,
   lowering said electrode and contact into contact with said assembly,
   applying a current pulse through said electrode to melt any coating on members of said assembly to effect metal to metal contact between said members,
   applying a second current pulse through said electrode and contact to effect a weld between said members,
   raising said electrode and contact from said assembly, and applying a current pulse to said electrode to effect a cleaning action.

6. In a welder of the type described, a table for supporting two members to be welded, at least one of said members being coated,
- a head adjustably supported with respect to said table,
- an electrode and contact mounted in said head,
- means for rocking said electrodes into and out of engagement with said members,
- a switch closed by said rocking means when said electrodes are lowered,
- a timing means controlled by said switch,
- a relay controlled by said timing means,
- a condenser circuit controlled by said relay to create a pulse in said electrode to melt said coating to attain metal to metal contact between said members and said electrode,
- a second relay controlled by said timing means, and
- a second condenser circuit controlled by said second relay to create a pulse in said electrode and contact to effect a welding of said members, said timing means controlling said first relay upon raising said electrode and contact from said members to connect a pulse to said electrode whereby said electrode is cleaned.

7. In a welder of the type described, a table for supporting two members to be welded, at least one of said members being coated,
- a means adjustably supporting an electrode and contact with respect to said table,
- means for rocking said electrode and contact into and out of engagement with said members,
- switching means closed by said rocking means when said electrodes are lowered,
- a timing means controlled by said switching means,
- contact means controlled by said timing means,
- circuit means controlled by said contact means to create a pulse in said electrode to melt said coating to attain metal to metal contact between said members and said electrode,
- a second contact means controlled by said timing means, and
- a second circuit means controlled by said second contact means to create a pulse in said electrode and contact to effect a welding of said members, said timing means controlling said first contact means upon raising said electrode and contact from said members to connect a pulse to said electrode whereby said electrode is cleaned.

8. In a welder,
- a table for supporting two members to be welded, one being coated,
- a head adjustably supported with respect to said table,
- support means also adjustable with respect to said table,
- an electrode carried by said support means.
- a spring contact carried by said support means,
- means for rocking said electrode and said contact from a raised position to one with said electrode in engagement with said coated member and said contact in engagement with said second member,
- a circuit closed by said rocking means when said electrode is lowered, to cause said electrode to melt said coating on the top and bottom of said first member to attain metal-to-metal contact between said electrode and said second member, and
- a second circuit connected through said electrode and contact to effect a weld between said members.

References Cited by the Examiner

UNITED STATES PATENTS

| | | | |
|---|---|---|---|
| 1,613,957 | 1/1927 | Madden | 219–117 X |
| 2,045,523 | 6/1936 | Fassler | 219–86 |
| 2,250,156 | 7/1941 | Ferguson | 219–85 |
| 2,474,340 | 6/1949 | Warner | 219–86 |
| 2,526,650 | 10/1950 | Gaibel. | |
| 2,675,454 | 4/1954 | Warner | 219–86 |

ANTHONY BARTIS, *Acting Primary Examiner.*

RICHARD M. WOOD, *Examiner.*

R. F. STAUBLY, *Assistant Examiner.*